US007768665B2

(12) United States Patent
Kadota

(10) Patent No.: US 7,768,665 B2
(45) Date of Patent: Aug. 3, 2010

(54) PRINTING CONTROL DEVICE FOR PROCESSING A SPOOL FILE AND PRINTING SYSTEM, PROGRAM PRODUCT, AND PRINTING CONTROL METHOD ASSOCIATED THEREWITH

(75) Inventor: Masatoshi Kadota, Takahama (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1394 days.

(21) Appl. No.: 11/199,207

(22) Filed: Aug. 9, 2005

(65) Prior Publication Data

US 2006/0033947 A1    Feb. 16, 2006

(30) Foreign Application Priority Data

Aug. 10, 2004    (JP)    .............................. 2004-233436

(51) Int. Cl.
   *G06F 3/12*    (2006.01)
(52) U.S. Cl. ...................... 358/1.15; 358/1.14; 709/225; 715/743
(58) Field of Classification Search ................. 709/225; 358/1.15, 1.14; 715/743
   See application file for complete search history.

(56) References Cited

U.S. PATENT DOCUMENTS 7,130,068 B1 * 10/2006 Ohta .......................... 358/1.15

| 7,225,256 | B2 * | 5/2007 | Villavicencio | ............... 709/225 |
| 2001/0015812 | A1 * | 8/2001 | Sugaya | ........................ 358/1.1 |
| 2002/0054312 | A1 * | 5/2002 | Tomita | ....................... 358/1.13 |
| 2003/0105862 | A1 * | 6/2003 | Villavicencio | ............... 709/225 |
| 2003/0105979 | A1 * | 6/2003 | Itoh et al. | .................... 713/201 |
| 2003/0160991 | A1 * | 8/2003 | Kadota | ....................... 358/1.13 |
| 2003/0233544 | A1 * | 12/2003 | Erlingsson | .................. 713/167 |

FOREIGN PATENT DOCUMENTS

| JP | 2000 056936 | 2/2000 |
| JP | 2000 181662 | 6/2000 |
| JP | 2003 131835 | 5/2003 |
| JP | 2004 038296 | 2/2004 |

* cited by examiner

*Primary Examiner*—Benny Q Tieu
*Assistant Examiner*—Jeremiah A Bryar
(74) *Attorney, Agent, or Firm*—Banner & Witcoff, Ltd

(57) ABSTRACT

When a spool file processing program starts with a system permission, first, a impersonation to a user permission is performed, and then the spool file is divided into EMF for each page. After division, the permission impersonation is released. Subsequently, a new spool file can be created with the system permission based on processing information, such as a collate copy, a reverse order, or the like. In addition, when a new printing job after processing is generated or when a new EMF drawing process after processing is performed, the permission impersonation is performed in advance. Accordingly, when the new printing job after processing is transmitted to an external server PC, permission is performed with the user permission.

20 Claims, 7 Drawing Sheets

PRINTING CONTROL DEVICE FOR PROCESSING A SPOOL FILE AND PRINTING SYSTEM, PROGRAM PRODUCT, AND PRINTING CONTROL METHOD ASSOCIATED THEREWITH

BACKGROUND

1. Field

A printing system in which a server apparatus connected to a printing device is connected to a client apparatus via a network. A printing control method in which the client apparatus constituting the printing system generates a printing job and requests to print to the server apparatus. A printing control device and a program product for use in the printing system.

2. Related Art

In the related art, it has been known a printing system in which a plurality of personal computers (hereinafter, simply referred to as 'PCs') are connected to one another via a network and a printer is connected to a specified PC, and a plurality of PCs connected to the network can use the printer.

FIG. 6 is one example of the printing system in which a server PC 102 connected to a printer 103 is connected to a client PC 101 via a network 105. Although not shown, the network 15 is connected to a plurality of client PCs. Thus, printing data can be outputted and printed from the server PC 102 to the printer 103. All client PCs connected to the network 105 can output and print printing data to the printer 103 via the network 105 and the server PC 102.

In the printing system configured in such a manner, a flow of a printing process when a request to print is made from the client PC 101 to the server PC 102 in order to print with the printer 103 will be schematically described with reference to FIG. 7. In FIG. 7, all the client operating system (OS) for the client PC 101 and the server OS for the server PC 102 are Windows (Registered Trademark) (the same is applied to the following description).

When a print instruction is made from an application 111 by the process of a user who uses the application 111, such as word processor, spread sheet software, or the like, the instruction is transmitted via a printer driver user interface (UI) 112 to a graphics device interface (GDI), which is a program module provided by the client OS. With this GDI, a device context (hereinafter, referred to as 'DC') serving as a virtual display area is created and provided to the application 111. Accordingly, a drawing process to the DC is performed by the application 111. As a result, an intermediate file, which is called an enhanced metafile (EMF), is generated for each page, without depending on the kind of a printer.

The intermediate file for each page is formed as one spool file for each printing job by a spooler system 113, which is one function of the client OS, and the spool file is temporarily stored (spooled) in a storage device by the spooler system 113.

Then, a print processor 114 transfers the spool file stored in the storage device to the printer driver GDI 115, such that the spool file is converted into printing data (printer control code) according to the output destination printer 103 by the printer driver GDI 115. Further, printing data is outputted to the server PC 102 via a port monitor 116.

The port monitor 116 requests to connect to the server PC 102 prior to outputting printing data. Then, in the server PC 102, the permission of whether or not the connection is permitted is performed. Therefore, when the permission is passed and the connection is permitted, printing data from the client PC 101 is inputted to the server PC 102 and is outputted to the printer 103 through a spooler system 131 or a printer processor 132. In addition, in the above-described example, in the client PC 101, the spool file is converted into the printer control code according to the output destination printer 103, the conversion into the printer control code is not performed in the printer driver GDI 133 for the server PC 102.

Here, in the above-described processes of the client PC 101, the print instruction from the application 111 by the process of the user or the operation of the printer driver UI 112 is performed with the user permission corresponding to the user. In addition, the processes from spooling of the spool file by the spooler system 113 to the request to connect (permission request) through the print processor 114 and the printer driver 115 by the port monitor 116 are performed with the impersonated user permission, which is originally the system permission.

Accordingly, an permission request from the port monitor 116, that is, an permission process by the server PC 102 is performed under the name of the client PC 101. For this reason, as long as the permission is performed under the name of the user whose access permission to the printer 103 is pre-registered, the connection is permitted through the permission.

Further, in addition to the above-described example of normal printing, for example, various kinds of special printing, such as multi-page printing, which is called "N in 1", such as, 4 in 1 and 2 in 1, and in which a plurality of divided pages is printed in the same page, overlap printing (so called watermark drawing) in which some image overlap other images, or page-transposition printing (reverse order) in which a plurality of divided pages are transposed and printed are demanded. Further, it has been considered that these special printing jobs are controlled by the personal computer. Here, the inventors have proposed a technology in which the spool file is processed to implement various kinds of special printing (for example, see JP-A-2003-131835).

Specifically, with respect to the spool file spooled by the spooler system 113, the spool file processing program 121, which is a process for the processing of the print processor 114, starts. Accordingly, the spool file is divided into an intermediate file for each page, and a predetermined processing is performed to the intermediate file. Thus, a new spool file is generated from the processed intermediate file and is returned to the spooler system 113. Accordingly, based on the new spool file generated, while a normal processing is possible in which the printer control code is generated by the printer driver GDI 115 according to the output destination printer, various kinds of special printing are implemented.

However, when the spool file is processed to generate the new spool file for special printing and then the connection to the server PC 102 via the print processor 114 or the printer driver GDI 115 is requested from the port monitor 116, the permission may be rejected by the server PC 102 and the special printing may not be performed with the printer 103.

SUMMARY

A printing system allows printing corresponding to a processed spool file to be performed, without receiving permission rejection from a server apparatus, when a request to print the processed spool file is made to the server apparatus.

A printing control device is installed in a client apparatus provided in a printing system in which a server apparatus connected to a printing device is connected to the client apparatus via a network. The printing system is configured that with respect to a request to print from the client apparatus to the server apparatus, when a requester who makes the request to print is a registered user registered in advance, the server apparatus controls the printing device according to the request to print. The printing system is configured to have, as an operation permission in the client apparatus: a user permission that is given for each user of the client apparatus registered in the printing system as the registered user to be accessible to only a predetermined area; and a system permission which is given to be accessible to an area to be accessed without restriction when the request to print is made to the server apparatus according to a print instruction by the user. The printing system is configured that, when the request to print is made with the user permission, a user corresponding to the user permission being the requestor, and when the request to print is made with the system permission, the requester being one different from the registered user. The printing control device includes: a spool file generating unit that, according to an input of the user, operates with the user permission corresponding to the user and generates a spool file for each printing job; a spool file control unit that starts to operate with the system permission, processes the spool file based on processing information when the processing information to process the spool file is included in the spool file generated by the spool file generating unit, and requests to print for outputting the processed spool file to the server apparatus; and a permission impersonating unit that impersonates the operation permission as the user permission when the spool file control unit makes the request to print.

A printing system includes: a server apparatus that is connected to a printing device; and a client apparatus that is connected to the server apparatus via a network, the client apparatus installed with a printing control device. With respect to a request to print from the client apparatus to the server apparatus, when a requester who makes the request to print is a registered user registered in advance, the server apparatus controls the printing device according to the request to print. The printing system is configured to have, as an operation permission in the client apparatus: a user permission that is given for each user of the client apparatus registered in the printing system as the registered user to be accessible to only a predetermined area; and a system permission which is given to be accessible to an area to be accessed without restriction when the request to print is made to the server apparatus according to a print instruction by the user. The printing system is configured that, when the request to print is made with the user permission, a user corresponding to the user permission being the requester, and when the request to print is made with the system permission, the requestor being one different from the registered user. The printing control device includes: a spool file generating unit that, according to an input of the user, operates with the user permission corresponding to the user and generates a spool file for each printing job; a spool file control unit that starts to operate with the system permission, processes the spool file based on processing information when the processing information to process the spool file is included in the spool file generated by the spool file generating unit, and requests to print for outputting the processed spool file to the server apparatus; and a permission impersonating unit that impersonates the operation permission as the user permission when the spool file control unit makes the request to print.

A computer-readable program product is for causing a computer system to serve as a printing control device installed in a client apparatus provided in a printing system in which a server apparatus connected to a printing device is connected to the client apparatus via a network. The printing system is configured that with respect to a request to print from the client apparatus to the server apparatus, when a requester who makes the request to print is a registered user registered in advance, the server apparatus controls the printing device according to the request to print. The printing system is configured to have, as an operation permission in the client apparatus: a user permission that is given for each user of the client apparatus registered in the printing system as the registered user to be accessible to only a predetermined area; and a system permission which is given to be accessible to an area to be accessed without restriction when the request to print is made to the server apparatus according to a print instruction by the user. The printing system is configured that, when the request to print is made with the user permission, a user corresponding to the user permission being the requester, and when the request to print is made with the system permission, the requestor being one different from the registered user. The program product causes the computer to perform procedures including: generating a spool file for each printing job with the user permission corresponding to the user according to an input of the user; processing the spool file with the system permission based on processing information when the processing information to process the spool file is included in-the spool file generated by the spool file generating unit, outputting the processed spool file to the server apparatus to request to print; and impersonating the operation permission as the user permission when requesting to print.

A printing control method is for a printing system having a server apparatus that is connected to a printing device and a client apparatus that is connected to the server apparatus via a network, the client apparatus installed with a printing control device. The printing system is configured to have, as an operation permission in the client apparatus: a user permission that is given for each user of the client apparatus registered in the printing system as the registered user to be accessible to only a predetermined area; and a system permission which is given to be accessible to an area to be accessed without restriction when the request to print is made to the server apparatus according to a print instruction by the user. The method includes: controlling by the server apparatus the printing device according to a request to print from the client apparatus to the server apparatus, when a requester who makes the request to print is a registered user registered in advance; impersonating the operation permission as the user permission in a case in which the control of the printing job is executed with the system permission, when a process to be performed with the user permission needs be executed.

DETAILED DESCRIPTION OF THE EMBODIMENTS

An embodiment will be described below with reference to the drawings.

Figure 1:
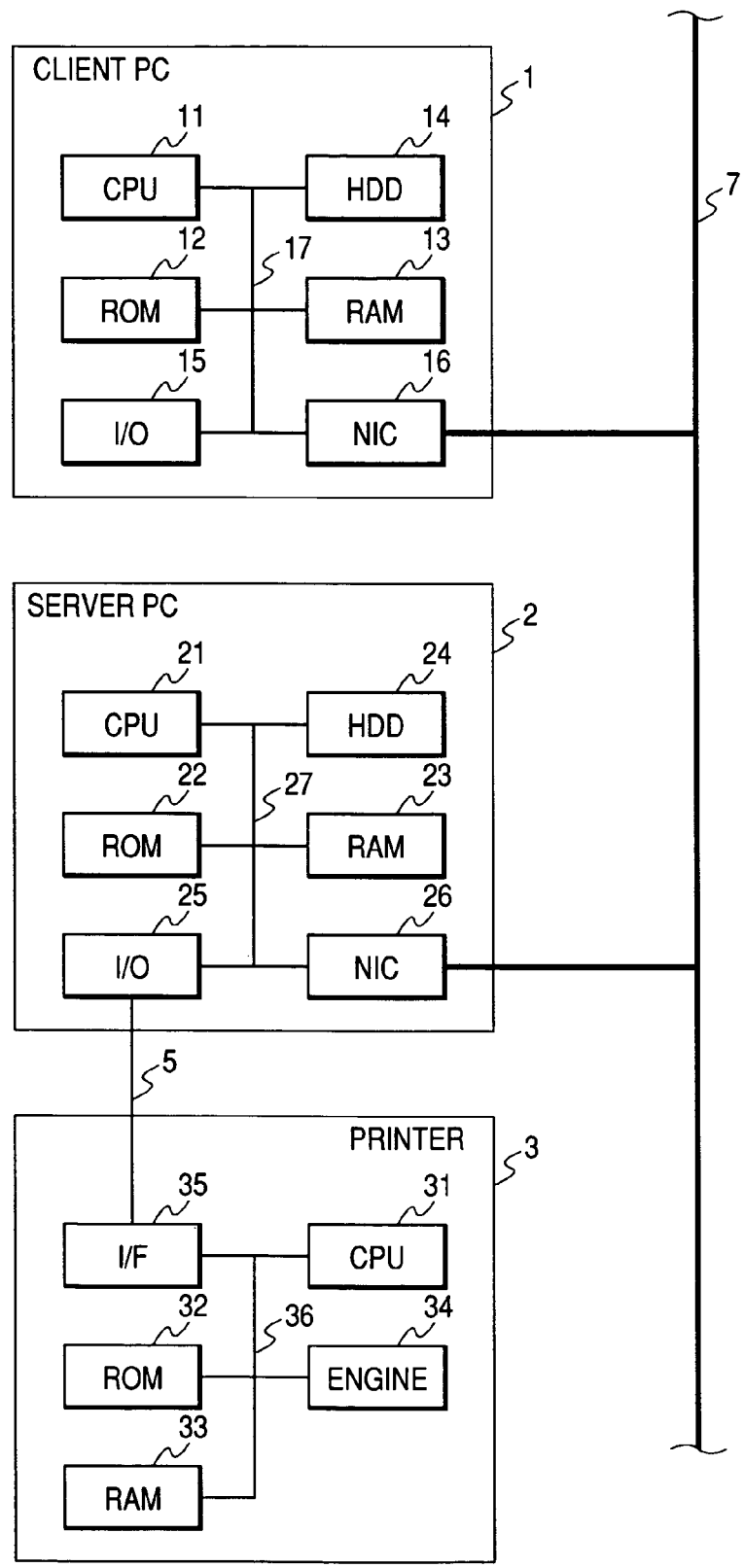
FIG. 1 is a schematic block diagram showing a hardware configuration of a printing system according to an embodiment.
Figure 6:
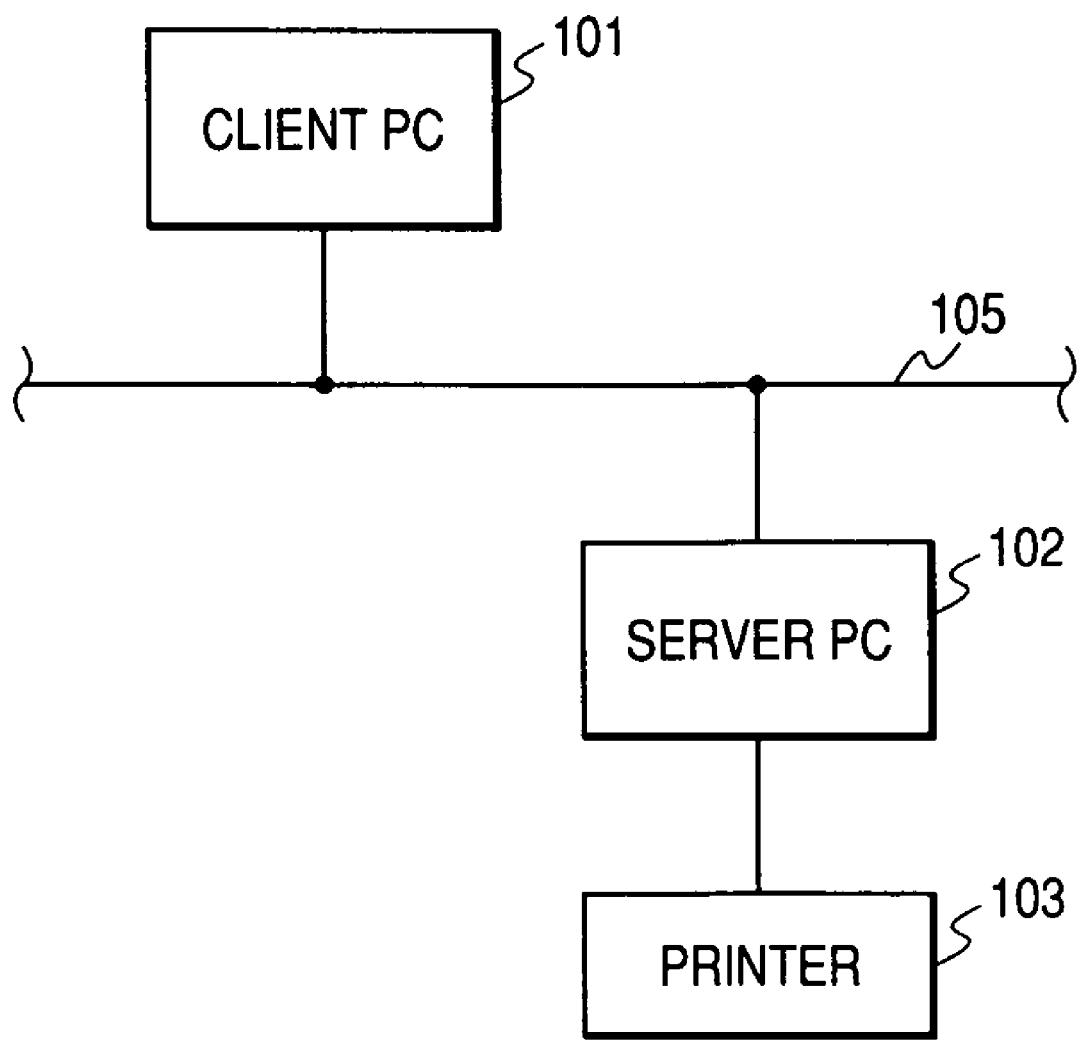
FIG. 6 is a diagram illustrating a schematic configuration of the printing system.

FIG. 1 shows hardware configuration of a printing system according to the present embodiment. As shown in FIG. 1, in the printing system, like the printing system shown in FIG. 6, a client PC 1 and a server PC 2 are connected to each other via a network, such as a local area network (LAN) 7, to communicate data. In addition, a printer 3 is connected to the server PC 2 as a printing device. Further, printing data is outputted from the server PC 2 to the printer 3 to perform desired printing, and printing data from the client PC 1 is also outputted to the printer 3 via the server PC 2. In addition, the printer 3 can be used from another client PC, which is not shown, connected to the network 7.

In the embodiment, a processing of a spool file (described later) is performed by starting an additional process from a print processor 56 (spool file processing program; The print processor 56 and the spool file processing program will be described later.), by processing spool data in the process, and by returning to the spooler system as an additional job after processing. In the process to start, a start source is a system, such that the process starts with a system permission. Accordingly, a directory or the like, to which the user having a restricted access permission cannot access, is accessed, such that special printing is implemented.

That is, during the spool file process for each printing job is made under the user name, in order to implement special printing, an additional process starts with the system permission (user name: System), such that the new printing job is generated. Further, when the new printing job generated with the system permission returns to the spooler system 55 (described later), a series of processes until the connection request is made from a port monitor 45 (described later) are performed with the system permission.

For this reason, as for the permission when the new printing job is outputted to a server PC 2 (described later), a client PC 1 (described later) requests the permission using the user name of 'System'. Then, System is not registered in the server PC 2 as the user name whose access is permitted, such that the permission is rejected.

As such, as an example in which the permission is rejected by starting the additional process for the spool file processing, specifically, in case of Windows, a case of the connection to the printer via a universal naming convention (UNC) port or the connection to the printer via a redirect port may be exemplified. When the connection is made using each port, a security is applied in the network and the user name is used for the permission thereof. For this reason, when the user name is System, the permission is rejected.

Moreover, by lowering the security level of the server PC 2 to establish, for example, 'printable by anyone', 'unconditionally permission for a request to print from the client PC 1', or the like, the permission of the server PC 2 can be allowed not to be rejected. However, in a network in a company, for example, such a low security level is rarely set, but a high level security is generally set, if necessary.

For this reason, in the network having the high security level as described above, even when the process for above-described special printing (start additional process) from the client PC 1 is performed, it has been expected that, as for the special printing job, printing is performed from the printer 3 via the server PC 2.

In the embodiment, in a case in which a user having a permission to access the server PC 2 for outputting printing data to the printer 3 accesses the server PC 2 from the client PC 1 (including other client PCs, which are not shown), when the permission under the user name is passed, printing data is permitted to be outputted to the printer 3 via the server PC 2.

The printer 3 includes a CPU 31 that controls the overall operation of the printer 3, a ROM 32 that stores various programs executed by the CPU 31, parameters, and the like, a RAM 33 that is used to store image data transmitted from the server PC 2 or that is used as a temporary working area of the CPU 31, an I/F 35 that is an interface for communicating data between the printer 3 and the server PC 2, and an engine 34 that forms (print and output) images on a printing paper (not shown) according to image data inputted from the server PC 2. These parts are connected to one another by an internal bus 36.

The client PC 1 includes an I/O 105 that is connected to the CPU 11, the ROM 12, the RAM 13, a hard disk drive (HDD) 14, a peripheral apparatus, and the like to communicate data among them, and a network interface card (NIC) 16. These are connected to each other via an internal bus 17, which is a general configuration in the related art. In addition, the I/O 15 includes various interfaces, such as a universal serial bus (USB), and the like.

Various kinds of data, such as text data or image data written and drawn on an application installed in the client PC 1, are outputted from the NIC 16 based on a print instruction from the user and are inputted to the server PC 2 via the network 7. In addition, the server PC 2 suitably processes printing data received from the client PC 1 and outputs processed printing data to the printer 3.

With focusing on the hardware configuration, the server PC 2 has the same configuration as that of the client PC 1 and thus the description thereof will be omitted. In addition, the server PC 2 and the printer 3 are connected, for example, via a USB interface between the I/O 25 of the server PC 2 and the I/F 35 of the printer 3.

Figure 2:
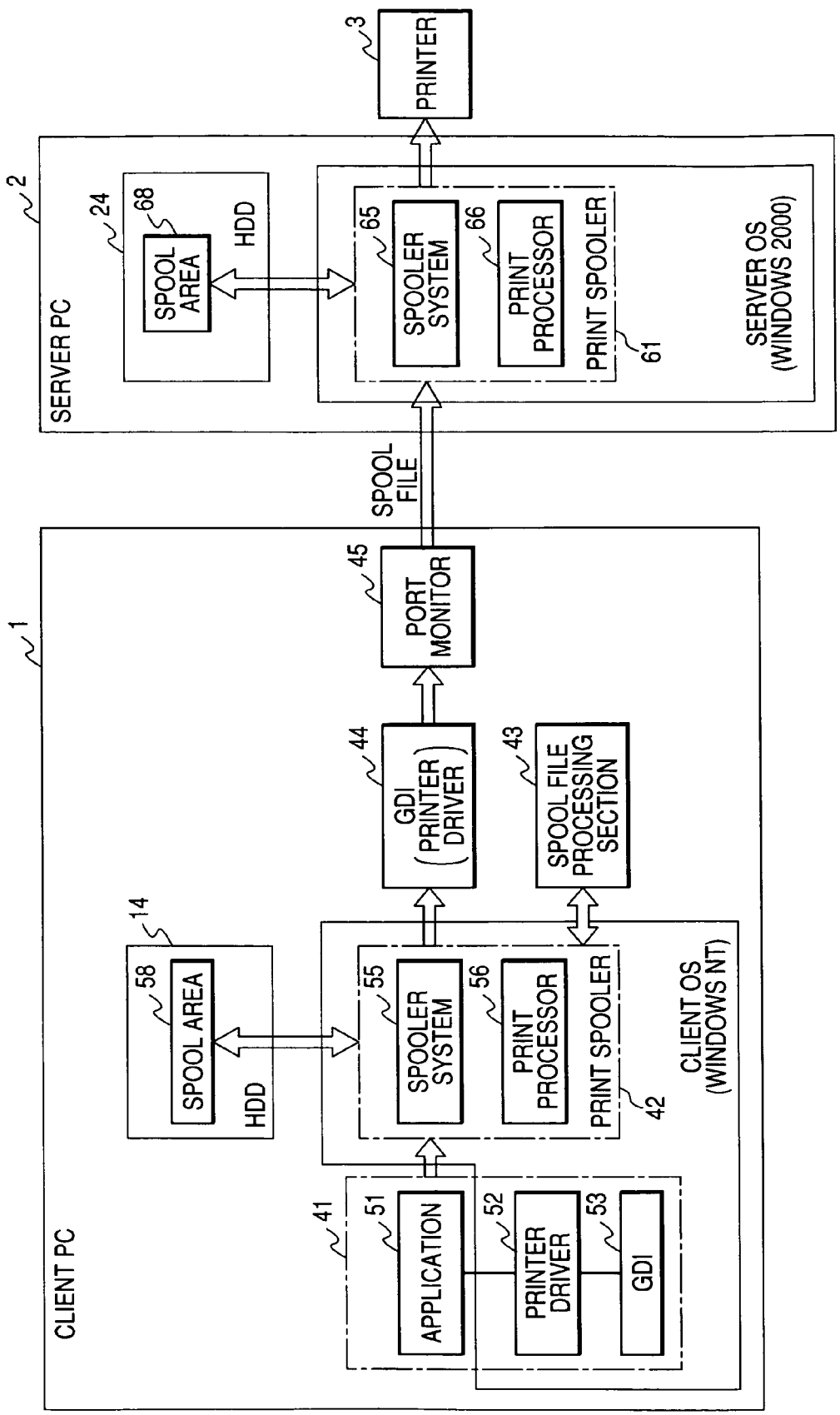
FIG. 2 is a schematic block diagram showing a software module of the printing system according to the embodiment.

FIG. 2 is a schematic block diagram showing a software module of the printing system according to the present embodiment. In the present embodiment, the client OS is described as Windows NT and the server OS is described as Windows 2000.

In the present embodiment, a print intermediate file generated in an intermediate file generating unit 41 is temporarily stored in a spool area 58 as a spool file for a printing job, and when processing information is included in the stored spool file, a spool file processing unit 43 processes the spool file and returns the processed spool file to the spool area 58. In addition, the processed spool file is converted into a print control code by a printer driver GDI 44 and transmitted to the server PC 2 via the port monitor 45.

In the server PC 2, a print spooler 61 temporarily stores received printing data (print control code) in a spool area 68. Then, printing data is outputted to the printer 3 depending on the operation state of the printer 3.

In the client PC 1 or the server PC 2, the OS is responsible for controlling hardware, such as the CPU 11 (21), the ROM 12 (22), the RAM 13 (23), and the I/O 15 (25), as shown in FIG. 1, and based on the OS, application software or utility software, such as a device driver, or the like, is operated. In addition, for the client PC 1 according to the present embodiment, a printer spooler 42 is a program module serving as one function of the client OS, and the spool file processing unit 43 and the printer driver GDI 44 are device drivers (program) included in the client PC for operating the printer 3 and control the operation of the printer 3 in conjunction with the client OS.

A print processor 56 is a program module that is added (installed) to the client PC 1 corresponding to the printer 3 and operates on the client OS, in addition to a print processor (not shown) that is essentially included in the OS (Windows NT). Therefore, the print processor 56 constitutes the printing control device, together with the spool file processing unit 43.

In the present embodiment, all the programs used to implement functions of the respective units of the client PC 1 are stored in the hard disk (HDD) 14. Like the server PC 2, all the programs used to implement functions of the respective units of the server PC 2 are stored in the HDD 24. Hereinafter, the operation of the printing system according to the present embodiment will be described.

As shown in FIG. 2, data written into an application 51 of the client PC 1 by the user is transmitted to a GDI 53, which is a program module provided by Windows NT, via a printer driver 52 and transmitted to a device context (DC), which is a display area virtualized by the GDI 53. In addition, printing data of the printing job is stored at an indicated coordinate of the DC, independently of a kind of device (printer, display, or the like), and thus drawing is performed on a virtualized device. The application 51 is application software, such as word processor or spread sheet software, to be operated on the OS.

The so-called GDI performs the DC management and the EMF formation, and performs the conversion of the process on the DC into the command depending on the device (for example, a printer or a display). Here, the former is provided by the OS and corresponds to the GDI 53 of FIG. 2. The latter is provided as a driver by a device manufacturer and corresponds to the printer driver GDI 44 of FIG. 2.

As such, by drawing on the DC, that is, the virtualized device, the EMF (intermediate file) is formed for each page, independently of the kind of the device. The EMF is stored in the ensured spool area 58 in the HDD 14 as a spool file, such that the EMF is coupled by the spooler system 55 to constitute one printing job. The spool file also includes processing information for performing special printing, such as multi-page printing, watermark drawing, reverse-order printing, collate copying for printing several copies, or the like.

That is, in a case in which the user prints data written into the application 51, when an instruction indicating for special printing exists, information indicating the purport (processing information used to process the spool file) is also added to the spool file. In addition, the spool area 58 is not necessarily ensured in the HDD 14 of the client PC 1. For example, a storage device may be provided outside the client PC 1, such that a portion of the storage device may be secured as the spool area 48. That is, as long as the spool area exists in a state in which the client PC 1 can manage, the spool area is not particularly limited.

In addition, when special printing, such as multi-page printing and watermark drawing, is performed, the spool file processing unit 43 is operated (the spool file processing program starts), and, with the spool file processing unit 43, the spool file for each printing job stored in the spool area 58 is processed for special printing. Specifically, the print processor 56 extracts the spool file stored in the spool area 58 and determines whether or not the processing information is included in the extracted spool file. Further, if it is judged that the processing information is included, the spool file is transferred to the spool file processing unit 43.

While the detailed description of the process for the spool file processing unit 43, that is, the specified process content by the spool file processing program will be described below, a schematic description is provided as follows. First, the spool file received from the print processor 56 is divided into an EMF (intermediate file) for each page. In addition, the EMF of each page after division is copied to a temporary file in the HDD 14. The temporary file is deleted when it is not required. In addition, prior to dividing the page, the processing information is obtained from the spool file to identify in advance which processing is to be performed. The area where the temporary file is expanded corresponds to a temporary storage area.

Subsequently, when there is provided the information indicating that a processing, such as the reverse order or collate copy, that is, a processing in which no processing is made for each page (hereinafter, referred to as 'first kind of processing), first, the spool file is processed based on the processing information, and thus the new EMF is generated. The new EMF after processing returns to the spool area 58 by the spooler system 55.

In addition, with respect to the new printing job processed by the spool file processing unit 43 to return to the spool area 58, the print processor 56 checks again whether or not there is the processing information. When the processing information is still included, the spool file of the new printing job is transferred again to the spool file processing unit 43.

In the spool file processing unit 43, similarly, first, it is judged whether or not the first kind of processing is to be provided. If not, there is provided a processing, such as watermark drawing or multi-page printing, that is, the processing in pages to be performed for each page (hereinafter, referred to as a second kind of processing).

In addition, when the processing is completed, the EMF of the page of which the processing is completed is transmitted to the printer driver GDI 44 by a subsequent print processor 56, is converted into a print control code corresponding to the printer 3 by the printer driver GDI 144, and is transmitted to the server PC 2 via the port monitor 45.

The print control code has different specifications for each manufacturer. For example, command sets by various page-description languages, such as the PCL of U.S. Hewlett-Packard Co. or PostScript (PS: Registered Trademark) of U.S. Adobe Co., can be used. For this reason, in order to correspond to the PDL used for the printer 3, the spool file having the EMF for each page is converted into the print control code according to the PDL by the printer driver GDI 44.

The port monitor 45 performs a connection request to the server PC 2 prior to transmitting the printer control code to the server PC 2. In the printing system according to the present embodiment, an access permission to various types of resources (not shown) that constitute the printing system is set for each user and is registered in advance to the printing system. Therefore, only a registered user can use the printer 3 via the server PC 2.

For this reason, when the user who is attempting to transmit printing data from the client PC 1 to the printer 3 actually requests to print, the print control code is generated and is transmitted to the server PC 2 in such a manner. At this time, however, the port monitor 45 transmits information on the request source (such as, the user name) to request the connection.

The server PC 2 that receives the information performs the permission based on the transmitted user name and, if the user is a registered one, permits the connection. Accordingly, printing data (print control code) from the client PC 1 is received by the server PC 2. In addition, printing data is temporarily stored in the spool area 68 by the spooler system 65. Then, the stored printing data is outputted to the printer 3, while the print processor 66 checks the operation state of the printer 3.

On the other hand, the printing system according to the present embodiment has a system permission having an unrestricted accessible range within a management range of the OS (here, Windows NT) and a user permission having a restricted accessible range for each user as an access permission in the client PC 1 (which corresponds to the operation permission).

In addition, when printing data to the server PC 2 is generated with the user permission, the user name transmitted by the connection request from the port monitor 45 corresponds to a user permission at that time, that is, the user name is one of the user who controls the client PC 1 to make the request to print. For this reason, as long as the user name is one of the registered user registered in the printing system, printing data can be transmitted to the server PC 2 under the permission of the server PC 2.

On the contrary, when printing data to the server PC 2 is generated with the system permission, the user name transmitted by the connection request from the port monitor is 'System'. The name 'System' corresponds to a user who is not registered as the registered user. In this case, the permission of the server PC 2 is rejected and thus the connection to the server PC 2 cannot be made.

Figure 7:
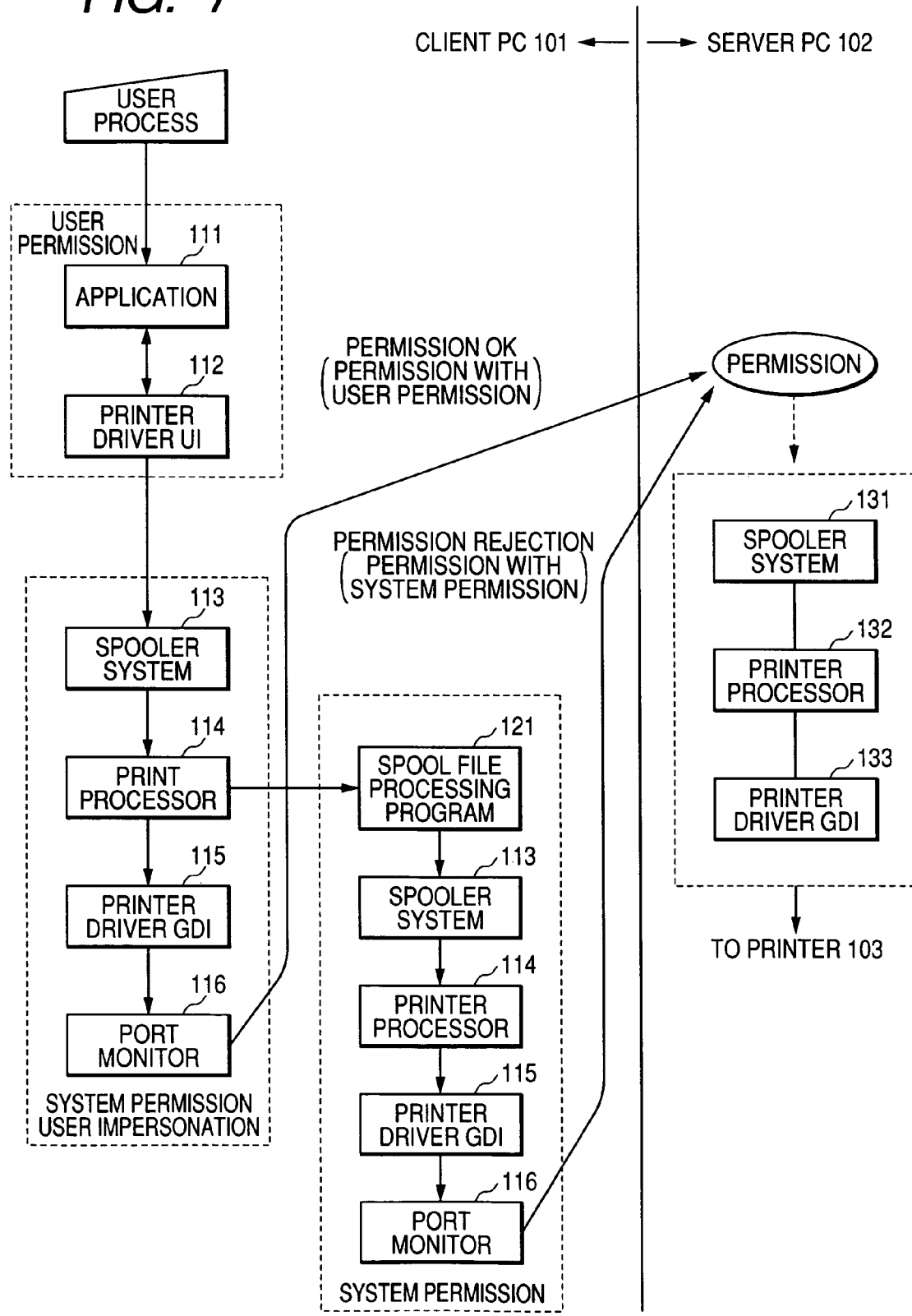
FIG. 7 is a diagram illustrating a flow of a printing process in a printing system according to the related art.

As such, an example in which printing data to the server PC 2 is generated with the system permission may include the processing of the spool file, as described above with reference to FIG. 7. That is, when the spool file has no processing information and when printing data is transmitted to the server PC 2 via the printer driver GDI 44 without the processing of the spool file, the transmission is made with the user permission, such that the permission is passed.

However, when the spool file includes the processing information and thus the print processor 56 starts another process (spool file processing program), since the process starts with the system permission, as described above, a start source, that is, a user of the new printing job after processing becomes 'System' and the new printing job cannot be printed.

In addition, according to the present embodiment, while the process (spool file processing program) is operating with the system permission, the system permission is impersonated (changed) as the user permission, if necessary, such that the connection request and the permission request to the server PC 2 are performed with the user permission (under the name of the user). Specifically, prior to starting the spool file processing program, that is, prior to being changed into the system permission, information on the user permission (user identification information) is acquired in advance. In addition, after the spool file processing program starts, the impersonation as the user permission is performed, if necessary, based on the acquired information. The detailed description thereof will be described with reference to FIGS. 3 and 4.

Figure 3:
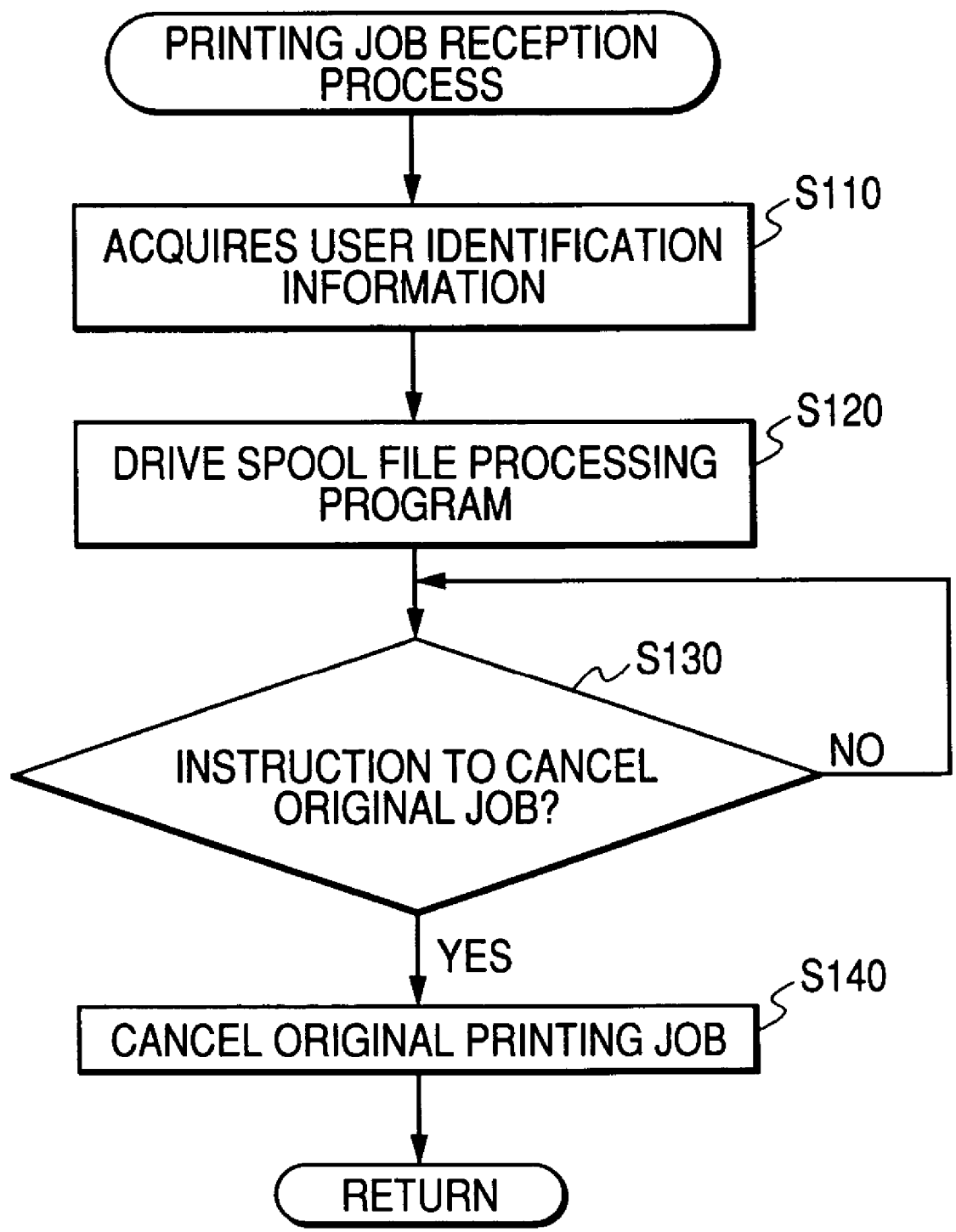
FIG. 3 is a flowchart showing a printing job reception process according to the embodiment.

FIG. 3 is a flowchart showing a printing job reception process according to the present embodiment. This printing job reception process is performed by the print processor 56 when the print processor 56 transfers the spool file temporarily spooled in the spool area 58 by the spooler system 55 to the spool file processing unit 43.

When the spool file is temporarily spooled in the spool area 58, the print processor 56 first acquires the user identification information for the user impersonation (Step S110). At the time of the processing by the print processor 56, the operation permission becomes a state in which the system permission is impersonated as the user permission, such that information on the impersonated user permission is acquired as the user identification information.

Next, the spool file is transferred to the spool file processing unit 43. That is, the spool file processing program starts with the system permission (Step S120). At this time, the user identification information acquired in the step S110 is transferred to the spool file processing program via a command line. Accordingly, when the spool file processing program is executed, if the system permission is impersonated as the user permission, the system permission can be impersonated as the user permission according to the user identification information.

In such a manner, after the additional process starts, an instruction indicating to cancel the original printing job is expected from another process (Step S130). When the instruction is provided, the original printing job is cancelled according to the instruction (Step S140).

Figure 4:
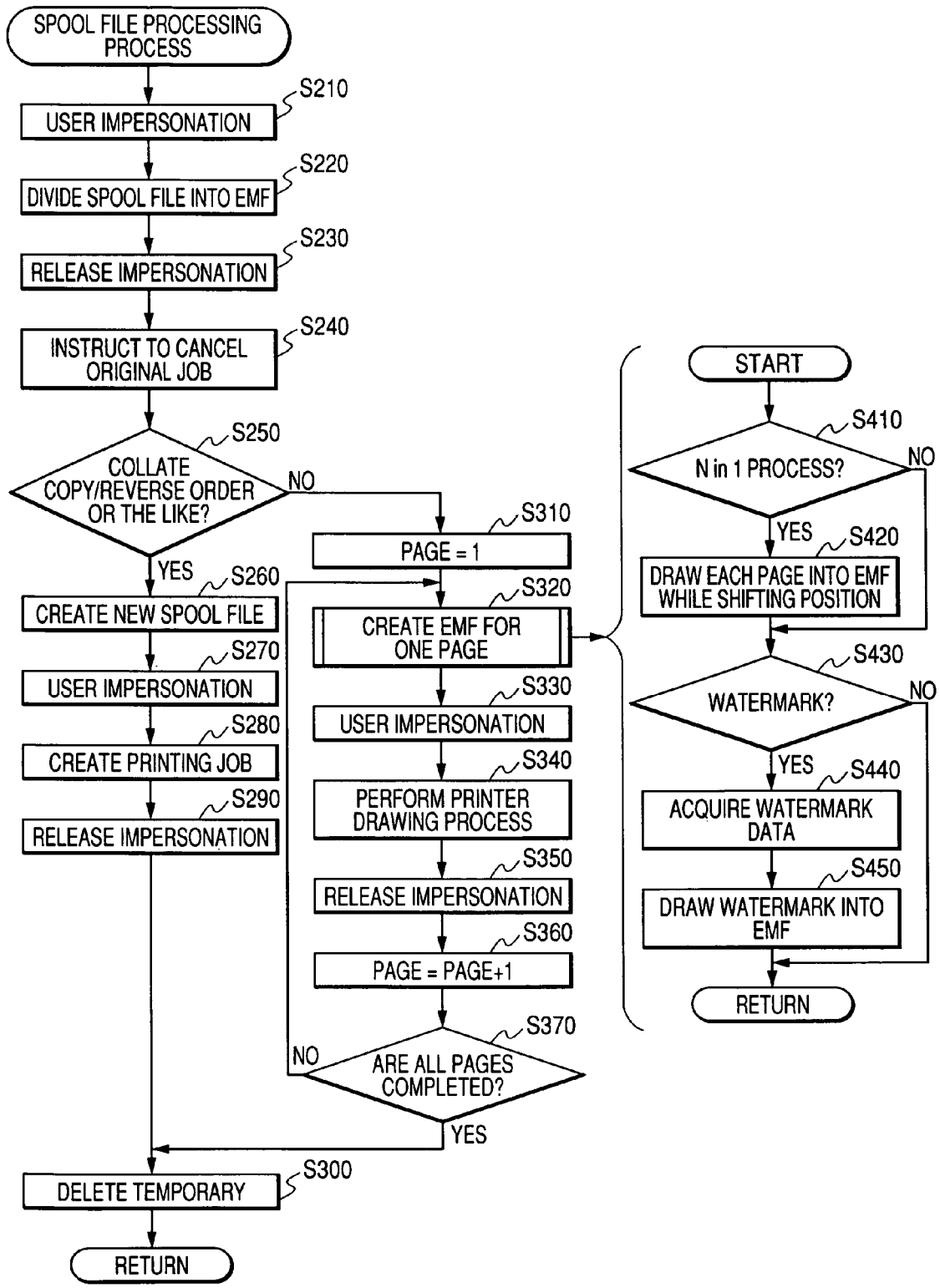
FIG. 4 is a flowchart showing a spool file processing process according to the embodiment.

Next, the content of the additional process (spool file processing program) that starts in the step S120 for the printing job reception process will be described with reference to FIG. 4. FIG. 4 is a flowchart showing a spool file processing process according to the present embodiment. The spool file processing process is performed when the spool file processing program for implementing a function of the spool file processing unit 43 is executed by the sever PC 2.

When the process starts, first, the impersonation as the user permission is performed (Step S210). This is to perform the subsequent EMF division process of the spool file (Step S220) with the user permission. In the step S120, the spool file is divided into the EMF for each page and is expanded as the temporary file. Next, the permission impersonation is released and thus the operation permission returns to the system permission (Step S230), and an instruction indicating to cancel the original printing job is outputted (Step S240). With this instruction, the judgment process of the step S130 in the printing job reception process shown in FIG. 3 is affirmative.

In such a manner, after the EMF for each page is expanded as the temporary file, it is judged whether or not the processing information included in the spool file is information indicating to perform the first kind of processing, such as collate copy or reverse order (Step S250). If not, the process progresses to the step S310, but, if so, the processing is performed based on the first kind of information and thus the new spool file is generated (Step S260). The new spool file generated in this step is stored again in the spool area 58.

Further, the process of generating the new spool file in the step S260 needs be performed with the system permission since the generated spool file is stored again in the spool area 58 by the spooler system 55. For this reason, according to the present embodiment, in the step S230 prior to the step S260, the user impersonation is released.

In addition, after the new spool file is generated, the new printing job is created (registered in the system) based on the spool file (Step S280). At this time, the creation of the new printing job needs be performed with the user permission, considering that the process of FIG. 3 is performed again to the printing job (user identification information is acquired). For this reason, the user impersonation is performed prior to the process of a step S280 (Step S270).

In addition, after the new printing job is generated in the step S280, the impersonation is released again and the operation permission returns to the system permission (Step S290), and the EMF of the original job expanded as the temporary file is deleted (Step S300). Then, the spool file processing process temporarily ends. Further, the process of FIG. 3 is performed again on the new printing job and, when there remains a non-performed processing, the spool file processing process of FIG. 4 is performed again.

Further, in the spool file processing process of FIG. 4, when the first kind of processing is completed and thus only the second kind of processing remains or when the processing information only on the second kind of processing is included in the spool file from the start, the process of the step S250 in the spool file processing process is judged to be negative. Then, the process progresses to S310 and a processing for each page is sequentially performed from the first page.

Specifically, assuming that the page to be processed first is '1' (Step S310), the processing for that page is performed and thus the EMF for the new one page is created (Step S320). More specifically, the process of the step S320 first determines whether or not the information indicating to perform multi-page printing is included as the processing information (Step S410). When the processing information is not included, the process progresses to a step S430. On the other hand, when the processing information is included, the processing is actually performed based on the information. Specifically, the EMF is drawn while a location of each page is shifted according to the processing information.

Subsequently, it is judged whether or not there exists processing information indicating to draw a watermark (Step S400). When there is no processing information, the process progresses to a step S330. On the other hand, when the processing information exists, the required watermark is obtained based on the processing information (Step S440).

Here, for example, when one user creates a bit map-type watermark and stores the watermark in an accessible folder, it can be expected that other users may not use the watermark according to the access permission. For this reason, according to the present embodiment, the acquisition of watermark data is performed with the system permission. In the case of an example of FIG. 4, the operation permission returns to the system permission due to the impersonation release in the step S230, such that the watermark data acquisition process in the step S440 is performed with the system permission. For this reason, the watermark registered in the system is surely acquired. After the watermark is acquired, the watermark is actually drawn (Step S450).

In such a manner, after the processing process for one page is performed, the user impersonation is performed again (Step S330) and then a print drawing process is performed (Step S340). The print drawing process is to transfer the processed spool file to the spooler system, which is performed by the user impersonation. The processed spool file is encoded by the printer driver GDI 44 and is transmitted to the server PC 2. At this time, the printer drawing process (Step S340) is impersonated as the user permission, such that, when the spool file is transferred to the server PC 2, the permission is performed under the name of the user.

Moreover, in the process of FIG. 3, for simplicity of the description, the process should start (Step S120) after the user identification information is acquired (Step S110). Alternatively, when the processing based on the processing information is completely performed, it can be considered that the need to process and the information does not exist, and thus the additional process does not start.

As such, the printer drawing process (Step S340) is performed in the state in which the system permission is impersonated as the user permission, such that information on the user permission to the next process of the print processor 56 is handed over and the transmission of printing data to the server PC 2 is also performed with the user permission.

After the printer drawing process for each page is completed, the impersonation as the user permission is released again, and the operation permission returns to the system permission (Step S350). In addition, it is judged whether or not the processing process for every page (Steps S320 and S340) is performed (Steps S360 and S370) and when the page to be processed still remains, the process returns to the step S320. When all pages are completed, the spool file processing process ends through the process of the step S300.

With the spool file processing process, the start of the process itself is performed with the system permission, and the operation permission is impersonated as the user permission or the impersonated user permission is released, if necessary. For this reason, after the spool file is processed, the conversion into printing data (print control code) based on the new printing job and the connection (permission) request to the server PC 2 through the port monitor 45 are performed with the user permission.

For this reason, as long as the user is registered as the registered user, the connection to the server PC 2 is permitted, and printing data corresponding to the processed printing job is outputted to the printer 3 through the server PC 2.

Figure 5:
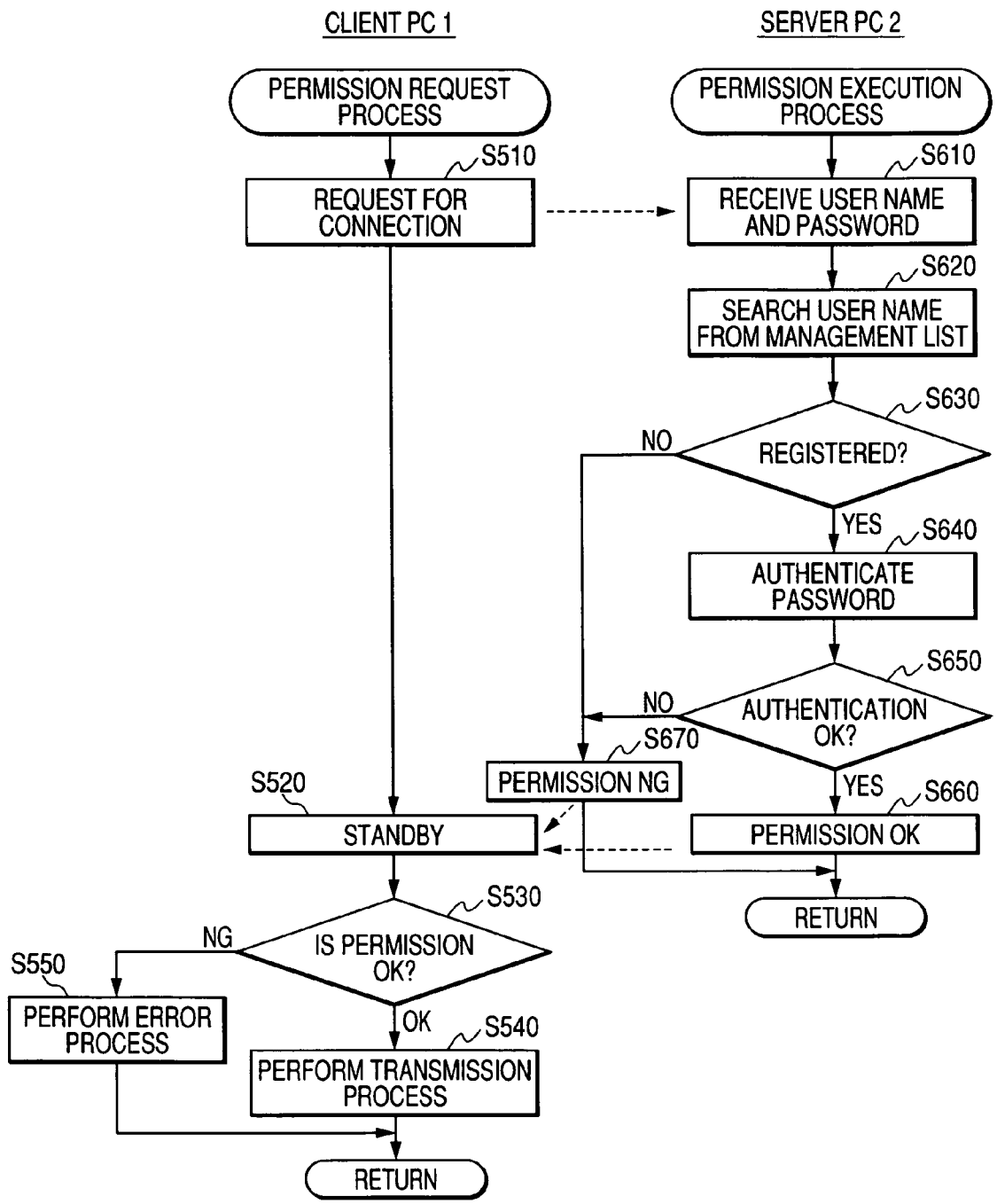
FIG. 5 is a flowchart showing an permission process according to the embodiment.

FIG. 5 illustrates an authentication performed between the client PC 1 and the server PC 2. FIG. 5 is a flowchart showing an authentication process performed by each of the PCs 1 and 2. As shown in FIG. 5, a user name and a password are transmitted from the port monitor 45 of the client PC 1, such that, when the connection is requested (Step S510), the user name and the password are received by the server PC 2 (Step S610). The user name is searched from a management list for managing the registered users (Step S620). In addition, when the user name is registered as the registered user (Step S630: YES), subsequently, an authentication is performed with respect to the password transmitted in Step S610 (Step S640). In addition, when the password is authenticated (Step S650: YES), it is judged that the access is performed by the registered normal user and thus the connection to the client PC 1 is permitted (Step S660). When the user name is not registered or the password is in discord, the permission is failed and thus the connection is not permitted (Step S670).

The client PC 1 waits until the permission result is transmitted from the server PC 2 (Step S520). In addition, when the permission is passed, printing data is transmitted to the server PC 2 (Step S540). On the other hand, when the permission is failed, the process progresses to an error process (Step S550).

According to the printing system of the present embodiment described above in detail, in the client PC 1, the spool file processing program starts with the system permission, and the permission impersonation is performed, if necessary. As a result, the permission to the server PC 1 is made with the user permission. For this reason, as long as the user is registered as the registered user, the permission of the server PC 2 is not rejected, such that a printing corresponding to the processed spool file can be performed.

In addition, in the spool file processing process of FIG. 4, the permission impersonation is performed prior to the EMF division of the spool file (Step S220). Therefore, even when the operation of the client PC 1 abnormally ends due to any reason during or after the expansion to the temporary file of the EMF, the user can delete the temporary file (that is, with the user permission).

Further, similarly, at the time of the process of the step S280 shown in FIG. 4, that is, even when the new printing job after processing is generated, since the operation permission is impersonated as the user permission, the new printing job is generated with the user permission. For this reason, subsequently, with respect to the process to be performed on the new printing job, the information on the user permission can be surely handed over and thus the user impersonation can be prevented from being impossible.

Further, only the impersonation as the user permission is performed and the impersonation is released (returns to the system permission), if necessary. Therefore, even when the process to be performed with the system permission is performed after the impersonation as the user permission, the process can be surely performed.

In addition, when an access to the folder which is not permitted according to the user, such as the acquisition of watermark data (Step S440 of FIG. 4) or the like, is required, the operation permission returns to the system permission in advance, such that data required for the processing can be surely acquired and the desired processing can be surely performed.

In the present embodiment, the intermediate generating unit 41 corresponds to a spool file generating unit. In addition, the spool file processing unit 43 corresponds to a processing unit, the port monitor 45 corresponds to a printing requesting unit, and the spooler system 55 corresponds to a spool unit. In addition, the spool file processing unit 43 also serves as a permission impersonating unit (permission changing unit).

In addition, in the printing job reception process of FIG. 3, the process of the step S110 corresponds to the process to be performed by the permission information acquiring unit. In addition, in the spool file processing process of FIG. 4, the process of the step S220 corresponds to the process to be performed by a storage unit, the process of the step S280 corresponds to the process to be performed by a new job generating unit. Each process of the steps S210, S270, and S330 corresponds to the process to be performed by the permission impersonating unit, each process of the steps S230, S290, and S350 corresponds to the process to be performed by a impersonation releasing unit, and the process of the step S440 corresponds to the process performed by a restricted area data acquiring unit.

Although the embodiment is described in detail in the above description, various modifications can be made without departing from the technical scope.

For example, in the spool file processing process of FIG. 4, the impersonation as the user permission is performed in the step just before the process to be processed with the impersonated user permission. In addition, the impersonation is released just after a predetermined process is performed with the impersonated user permission. Alternatively, the timing of the impersonation or the timing of the impersonation release is not limited to the timing shown in FIG. 4. The operation permission can be properly selected, as long as, when the user permission is required, the impersonation as the user permission is performed and, when the system permission is required, the operation permission returns to the system permission.

Further, while the present embodiment has been descried by way of the example in which the printer 3 is connected to the server PC 2, not to the network 7, a printing system having a configuration in which the printer 3 is connected to the network 7 (in this case, printing data from the client PC passes through the server PC 2) may be realized.

Further, the above description is made by way of the example in which various programs (specifically, programs used to implement the functions of the spool file processing unit 43, the print processor 56, and the like used to serve as the printing control device) are all stored in the HDD 14. Alternatively, various programs may also be recorded in a computer readable recording medium, such as the floppy disk, the magneto-optical disk, the CD-ROM, the hard disk, or the like.

In this case, with the programs stored in the storage medium, which are loaded on the computer system to start, if necessary, the spool file processing device can be implemented.

Further, with each program recorded in the ROM or the backup ROM as a computer readable recording medium, the ROM or the backup ROM may be incorporated into the computer system. In addition, the program can be installed in the computer via a communication link. The program transmitted through the communication link, when installed in the computer on a computer readable recording medium, corresponds to a program product for use in the printing system.

The foregoing description of the embodiment has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application program to enable one skilled in the art to utilize the invention in various embodiments and with various modifications as are suited to the particular use contemplated. It is intended that the scope of the invention be defined by the claims appended hereto, and their equivalents.

What is claimed is:

1. A printing control device installed in a client apparatus provided in a printing system in which a server apparatus connected to a printing device is connected to the client apparatus via a network,
wherein the printing system is configured that with respect to a request to print from the client apparatus to the server apparatus, when a requester who makes the request to print is a registered user registered in advance, the server apparatus controls the printing device according to the request to print,
wherein the printing system is configured to have, as an operation permission in the client apparatus:
a user permission that is given for each user of the client apparatus registered in the printing system as the registered user to be accessible to only a predetermined area; and
a system permission which is given to be accessible to an area to be accessed without restriction when the request to print is made to the server apparatus according to a print instruction by the user,
wherein the printing system is configured that, when the request to print is made with the user permission, a user corresponding to the user permission being the requester, and when the request to print is made with the system permission, the requester being one different from the registered user, and
wherein the printing control device comprises:
a spool file generating unit that, according to an input of the user, operates with the user permission corresponding to the user and generates a spool file for a printing job;
a spool file control unit that starts to operate with the system permission when processing information to process the spool file is included in the spool file generated by the spool file unit, processes content of the spool file based on the processing information, and requests to print for outputting the processed spool file to the server apparatus; and a permission impersonating unit that impersonates the operation permission as the user permission when the spool file control unit makes the request to print.

2. The printing control device according to claim 1, wherein the spool file control unit includes:
a processing unit that processes the spool file based on the processing information; and
a print requesting unit that makes the request to print for outputting the spool file processed by the processing unit to the server apparatus, and
wherein the permission impersonating unit performs the impersonation before the print requesting unit operates.

3. The printing control device according to claim 2, wherein the spool file control unit includes a storage unit that stores printing intermediate file in a predetermined temporary storage area, the printing intermediate file being generated by dividing the spool file generated by the spool file generating unit,
wherein the processing unit processes each print intermediate file stored in the temporary storage area by the storage unit, and
wherein the permission impersonating unit performs the impersonation when the storage unit stores each print intermediate file in the temporary storage area.

4. The printing control device according to claim 2, further comprising a permission information acquiring unit that acquires information on the user permission when the spool file to be processed is generated, before the processing unit processes the spool file,
wherein the permission impersonating unit performs the impersonation with the user permission corresponding to the information acquired by the permission information acquiring unit.

5. The printing control device according to claim 4, wherein the spool file generated by the spool file generating unit includes a plurality of processing information,
wherein the spool file control unit includes a new job generating unit that, when the processing unit has processed the spool file based on any one of the processing information, generates a second printing job based on the processed spool file, and the processing unit processes a spool file of the second printing job, and
wherein the permission impersonating unit performs the impersonation when the new job generating unit generates the second printing job.

6. The printing control device according to claim 1, wherein the spool file control unit includes a impersonation releasing unit that, after the impersonation is performed by the permission impersonating unit, returns the operation permission to the system permission with a predetermined timing at which the operation with the system permission is required.

7. The printing control device according to claim 6, wherein the spool file control unit includes a spool unit that stores the spool file of a second printing job in a predetermined spool area to be accessible with the system permission, and
wherein the impersonation releasing unit returns the operation permission to the system permission when the spool unit stores the spool file of the second printing job in the spool area.

8. The printing control device according to claim 6, further comprising a restricted area data acquiring unit that, when information purporting that data stored in a restricted area of the client apparatus having a limited number of accessible users is to be acquired exists, acquires data to be acquired from the restricted area as the processing information,
wherein the impersonation releasing unit returns the operation permission to the system permission when data is acquired by the restricted area data acquiring unit.

9. The printing control device according to claim 8, wherein the client apparatus has an accessible area set for each user therein.

10. A printing system comprising:
a server apparatus that is connected to a printing device; and
a client apparatus that is connected to the server apparatus via a network, the client apparatus installed with a printing control device,
wherein with respect to a request to print from the client apparatus to the server apparatus, when a requester who makes the request to print is a registered user registered in advance, the server apparatus controls the printing device according to the request to print,
wherein the printing system is configured to have, as an operation permission in the client apparatus:
a user permission that is given for each user of the client apparatus registered in the printing system as the registered user to be accessible to only a predetermined area; and
a system permission which is given to be accessible to an area to be accessed without restriction when the request to print is made to the server apparatus according to a print instruction by the user,
wherein the printing system is configured that, when the request to print is made with the user permission, a user corresponding to the user permission being the requestor, and when the request to print is made with the system permission, the requestor being one different from the registered user, and
wherein the printing control device includes:
a spool file generating unit that, according to an input of the user, operates with the user permission corresponding to the user and generates a spool file for a printing job;
a spool file control unit that starts to operate with the system permission when processing information to process the spool file is included in the spool file generated by the spool file unit, processes content of the spool file based on the processing information, and requests to print for outputting the processed spool file to the server apparatus; and
a permission impersonating unit that impersonates the operation permission as the user permission when the spool file control unit makes the request to print.

11. A computer-readable medium which stores a program for causing a computer system to serve as a printing control device installed in a client apparatus provided in a printing system in which a server apparatus connected to a printing device is connected to the client apparatus via a network,
wherein the printing system is configured that with respect to a request to print from the client apparatus to the server apparatus, when a requester who makes the request to print is a registered user registered in advance, the server apparatus controls the printing device according to the request to print,
wherein the printing system is configured to have, as an operation permission in the client apparatus:
a user permission that is given for each user of the client apparatus registered in the printing system as the registered user to be accessible to only a predetermined area; and a system permission which is given to be accessible to an area to be accessed without restriction when the request to print is made to the server apparatus according to a print instruction by the user, wherein the printing system is configured that, when the request to print is made with the user permission, a user corresponding to the user permission being the requester, and when the request to print is made with the system permission, the requester being one different from the registered user, and wherein the program product causes the computer to perform procedures comprising:

generating a spool file for a printing job with the user permission corresponding to the user according to an input of the user;

when processing information to process the spool file is included in the spool file generated by the spool file unit, processing content of the spool file based on the processing information with the system permission outputting the processed spool file to the server apparatus to request to print; and impersonating the operation permission as the user permission when requesting to print.

12. The computer-readable medium according to claim 11, wherein at least a program piece that performs the procedure of processing and outputting the spool file is configured in a system process that, as for operation system to be executed by the computer for managing the computer to control the execution of the program product, starts the execution with a privilege mode to be accessible to an area to be managed by operation system without restriction, and wherein a program piece that performs the procedure of impersonating the operation permission is configured to change the operation mode of the computer from the privilege mode to a user mode in which an access to the area managed by operation system is restricted corresponding to the user permission.

13. The computer-readable medium according to claim 11 further causing the computer to perform procedures comprising returning the operation permission to the system permission with a predetermined timing at which the operation with the system permission is required, after the impersonation is performed, wherein a program piece that performs the procedure of returning the operation permission is configured to change the operation mode of the computer to a privilege mode, the privilege mode to be accessible to an area to be managed by operation system without restriction, from a impersonated user mode in which an access to the area managed by operation system is restricted corresponding to the user permission.

14. A printing control method for a printing system having a server apparatus that is connected to a printing device and a client apparatus that is connected to the server apparatus via a network, the client apparatus installed with a printing control device, wherein the printing system is configured to have, as an operation permission in the client apparatus:

a user permission that is given for each user of the client apparatus registered in the printing system as the registered user to be accessible to only a predetermined area; and a system permission which is given to be accessible to an area to be accessed without restriction when the request to print is made to the server apparatus according to a print instruction by the user, wherein the method comprising:

controlling by the server apparatus the printing device according to a request to print from the client apparatus to the server apparatus, when a requester who makes the request to print is a registered user registered in advance;

impersonating the operation permission as the user permission in a case in which control of a printing job is executed with the system permission, when a process to be performed with the user permission needs be executed;

wherein, when processing information to process the spool file is included in the spool file generated by the spool file unit, the control of the printing job being executed with the system permission is a process to a spool file for processing content of the spool file based on the processing information, and wherein a process to be executed with the user permission is a process that requests to print to the server apparatus based on the processed spool file.

15. The printing control method according to claim 14, wherein, after the impersonation as the user permission, when the process to be executed with the system permission needs be executed, the operation permission returns to the system permission again.

16. A printing control device installed in a client apparatus provided in a printing system in which a server apparatus connected to a printing device is connected to the client apparatus via a network, wherein the printing system is configured that with respect to a request to print from the client apparatus to the server apparatus, when a requester who makes the request to print is a registered user registered in advance, the server apparatus controls the printing device according to the request to print, wherein the printing system is configured to have, as an operation permission in the client apparatus:

a user permission that is given for each user of the client apparatus registered in the printing system as the registered user to be accessible to only a predetermined area; and a system permission which is given to be accessible to an area to be accessed without restriction when the request to print is made to the server apparatus according to a print instruction by the user, wherein the printing system is configured that, when the request to print is made with the user permission, a user corresponding to the user permission being the requester, and when the request to print is made with the system permission, the requestor being one different from the registered user, and wherein the printing control device comprises:

a spool file generating unit that, according to an input of the user, operates with the user permission corresponding to the user and generates a spool file for a printing job; and a spool file control unit that starts to operate with the system permission when processing information to process the spool file is included in the spool file generated by the spool file unit, processes content of the spool file based on the processing information, and requests to print for outputting the processed spool file to the server apparatus; and a permission changing unit that changes the operation permission into the user permission when the spool file control unit makes the request to print.

17. A printing system comprising:

a server apparatus that is connected to a printing device; and a client apparatus that is connected to the server apparatus via a network, the client apparatus installed with a printing control device, wherein with respect to a request to print from the client apparatus to the server apparatus, when a requester who makes the request to print is a registered user registered in advance, the server apparatus controls the printing device according to the request to print, wherein the printing system is configured to have, as an operation permission in the client apparatus:

a user permission that is given for each user of the client apparatus registered in the printing system as the registered user to be accessible to only a predetermined area; and a system permission which is given to be accessible to an area to be accessed without restriction when the request to print is made to the server apparatus according to a print instruction by the user, wherein the printing system is configured that, when the request to print is made with the user permission, a user corresponding to the user permission being the requester, and when the request to print is made with the system permission, the requester being one different from the registered user, and wherein the printing control device includes:

a spool file generating unit that, according to an input of the user, operates with the user permission corresponding to the user and generates a spool file for a printing job;

a spool file control unit that starts to operate with the system permission when processing information to process the spool file is included in the spool file generated by the spool file unit, processes content of the spool file based on the processing information, and requests to print for outputting the processed spool file to the server apparatus; and a permission changing unit that changes the operation permission into the user permission when the spool file control unit makes the request to print.

18. A computer-readable medium which stores a program for causing a computer system to serve as a printing control device installed in a client apparatus provided in a printing system in which a server apparatus connected to a printing device is connected to the client apparatus via a network, wherein the printing system is configured that with respect to a request to print from the client apparatus to the server apparatus, when a requester who makes the request to print is a registered user registered in advance, the server apparatus controls the printing device according to the request to print, wherein the printing system is configured to have, as an operation permission in the client apparatus:

a user permission that is given for each user of the client apparatus registered in the printing system as the registered user to be accessible to only a predetermined area; and a system permission which is given to be accessible to an area to be accessed without restriction when the request to print is made to the server apparatus according to a print instruction by the user, wherein the printing system is configured that, when the request to print is made with the user permission, a user corresponding to the user permission being the requester, and when the request to print is made with the system permission, the requestor being one different from the registered user, and wherein the program product causes the computer to perform procedures comprising:

generating a spool file for a printing job with the user permission corresponding to the user according to an input of the user;

when processing information to process the spool file is included in the spool file generated by the spool file unit, processing content of the spool file based on the processing information with the system permission, outputting the processed spool file to the server apparatus to request to print; and changing the operation permission into the user permission when requesting to print.

19. A printing control method for a printing system having a server apparatus that is connected to a printing device and a client apparatus that is connected to the server apparatus via a network, the client apparatus installed with a printing control device, wherein the printing system is configured to have, as an operation permission in the client apparatus:

a user permission that is given for each user of the client apparatus registered in the printing system as the registered user to be accessible to only a predetermined area; and a system permission which is given to be accessible to an area to be accessed without restriction when the request to print is made to the server apparatus according to a print instruction by the user, wherein the method comprising:

controlling by the server apparatus the printing device according to a request to print from the client apparatus to the server apparatus, when a requester who makes the request to print is a registered user registered in advance;

changing the operation permission into the user permission in a case in which control of a printing job is executed with the system permission, when a process to be performed with the user permission needs be executed;

wherein, when processing information to process the spool file is included in the spool file generated by the spool file unit, the control of the printing job being executed with the system permission is a process to a spool file for processing content of the spool file based on the processing information, and wherein a process to be executed with the user permission is a process that requests to print to the server apparatus based on the processed spool file.

20. The printing control device according to claim 1, wherein the printing system is further configured that, when the processing information is not included in the spool file generated by the spool file generating unit, the request to print for outputting the spool file is made with the user permission, without being processed by the spool file control unit and without starting the spool file control unit.

* * * * *